(12) United States Patent
Gordon

(10) Patent No.: US 7,752,993 B2
(45) Date of Patent: Jul. 13, 2010

(54) METHOD AND APPARATUS FOR A GAUGE FOR INDICATING A PRESSURE OF A FLUID

(76) Inventor: Joseph B. Gordon, 16 Carriage Hill Dr., Branford, CT (US) 06405

( * ) Notice: Subject to any disclaimer, the term of this patent is extended or adjusted under 35 U.S.C. 154(b) by 178 days.

(21) Appl. No.: 11/753,697

(22) Filed: May 25, 2007

(65) Prior Publication Data

US 2008/0289567 A1    Nov. 27, 2008

(51) Int. Cl.
*G01L 19/00* (2006.01)
(52) U.S. Cl. ............... 116/267; 116/266; 73/716
(58) Field of Classification Search ......... 116/266–268, 116/271, 204, 264, 284; 73/861.47, 716
See application file for complete search history.

(56) References Cited

U.S. PATENT DOCUMENTS

| | | | | |
|---|---|---|---|---|
| 2,105,127 | A * | 1/1938 | Petroe ................... | 73/861.47 |
| 2,574,866 | A * | 11/1951 | Fahrlander ............. | 73/861.58 |
| 3,429,291 | A * | 2/1969 | Hoffman ................ | 116/267 |
| 3,528,290 | A * | 9/1970 | Lecocq ................. | 73/291 |
| 3,603,282 | A | 9/1971 | Abromaitis | |
| 3,948,103 | A * | 4/1976 | Rosaz ................... | 73/744 |
| 4,030,365 | A | 6/1977 | Phillips et al. | |
| 4,058,016 | A | 11/1977 | Schwartz | |
| 4,374,475 | A * | 2/1983 | Hestich ................. | 73/736 |
| 4,787,254 | A * | 11/1988 | Duckworth ............ | 73/861.62 |
| 5,063,749 | A | 11/1991 | Manz | |
| 5,181,391 | A * | 1/1993 | Manz ..................... | 62/129 |
| 6,763,725 | B1 * | 7/2004 | Huang .................. | 73/756 |
| 6,981,421 | B2 * | 1/2006 | Palmer et al. ......... | 73/735 |
| 7,040,175 | B1 * | 5/2006 | Huang .................. | 73/732 |
| 7,249,517 | B2 * | 7/2007 | Heuer et al. .......... | 73/722 |
| 7,281,490 | B2 * | 10/2007 | Buchanan ............. | 116/271 |

* cited by examiner

*Primary Examiner*—R. A. Smith
*Assistant Examiner*—Tania C Courson
(74) *Attorney, Agent, or Firm*—St. Onge Steward Johnston & Reens LLC

(57) ABSTRACT

The invention relates to a method and apparatus for a gauge for indicating a pressure of a fluid, including a gauge having a face where the face has a first plurality of graduation marks, each for indicating a pressure in an ascending direction. The face also has a second plurality of graduation marks, each for indicating a pressure in a descending direction. In addition, the gauge includes a sensor magnet for detecting the pressure of the fluid, a pointer magnet coupled to a pointer and in communication with the sensor magnet for moving the pointer in correspondence with a movement of the sensor magnet, and wherein the pointer traverses across both the first and second pluralities of graduation marks for indicating the pressure of the fluid in either an ascending direction or descending direction.

16 Claims, 7 Drawing Sheets

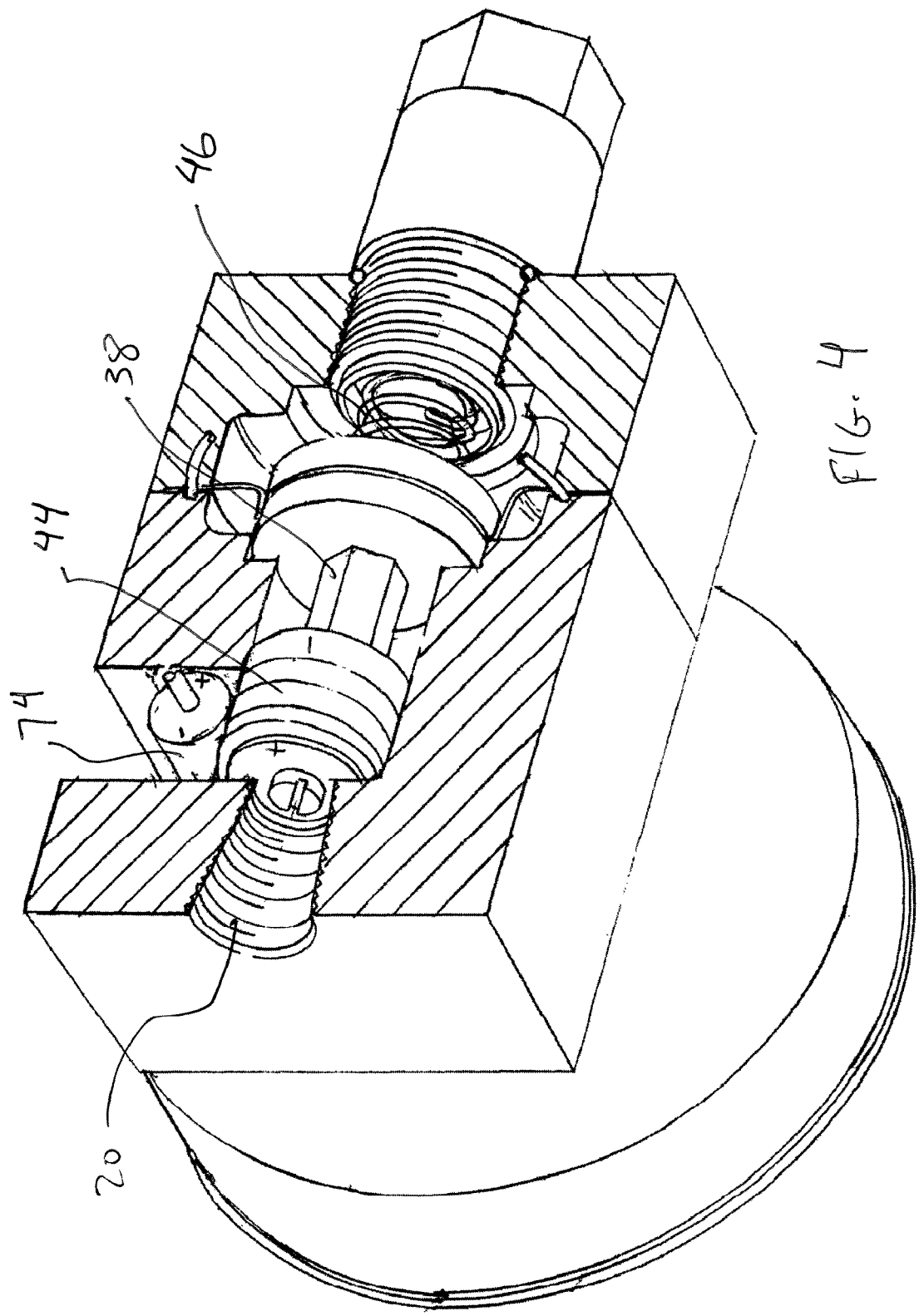

METHOD AND APPARATUS FOR A GAUGE FOR INDICATING A PRESSURE OF A FLUID

FIELD OF THE INVENTION

The invention relates to a pressure gauge for measuring a difference in pressure in either an ascending or descending direction.

BACKGROUND OF THE INVENTION

Differential pressure gauges are typically known in the art for aiding in monitoring the volumes of gases or liquids. A differential pressure gauge often functions by monitoring pressure on opposite sides of a piston-magnet or diaphragm-magnet sensor. Changes in the pressure difference will normally cause the sensor assembly to move in proportion to the change.

A rotary magnet, usually located in a separate body cavity and isolated from acting pressures, is typically rotated by magnetic coupling to linear movement of the sensor magnet. A pointer attached to the rotary magnet may indicate differential pressure on an easy to read dial.

However, there is usually a lag in position and/or time between the movement of the sensor magnet and the rotary magnet because the rotary magnet follows the action of and reacts to the sensor magnet's movements. Because of this lag, the gauge is typically calibrated for measuring a pressure differential so that the lag is taken into account. If the lag is not accounted, the measurement may not be accurate.

In some instances, calibration is performed while pressure is increasing, or in the ascending direction. In other instances, calibration is performed as pressure is decreasing, or in the descending direction. Several factors may determine the direction of the pressure during calibration, such as the type of gauge, the fluid being measured, the apparatus that contains the fluid, and the like.

Because of this, operators in the field that are measuring pressure at a customer's location normally need to have at least two gauges in order to measure pressure differential since calibration may be in either the ascending or descending direction. This problem can be exacerbated if calibration needs to be performed multiple times, which may occur if the gauge is dropped or if the gauge is undergoing maintenance such as changing magnets. In some cases, the operators calibrate the gauge often because it enhances accuracy of the measurements.

What is desired, therefore, is gauge that reduces the time needed to measure pressure at the customer's location. A further desire is a gauge that reduces calibration time without sacrificing accuracy. Another desire is a gauge that is easy to calibrate regardless of the direction of the pressure. Yet another desire is a gauge that eliminates the inaccuracy caused by positional lag, where positional lag is present due to a magnet pulling in each direction and the sensor magnet must be displaced in each direction to create pull on the rotary magnet.

SUMMARY OF THE INVENTION

It is therefore an object of the invention to provide a single gauge that performs the duties of multiple gauges.

Another object is a gauge that is portable and reduces calibration time.

A further object is a gauge that is capable of measuring pressure in either the ascending or descending direction.

These and other objects of the invention are achieved by a gauge for indicating a pressure of a fluid, including a gauge having a face where the face has a first plurality of graduation marks, each for indicating a pressure in an ascending direction. The face also has a second plurality of graduation marks, each for indicating a pressure in a descending direction. In addition, the gauge includes a sensor magnet for detecting the pressure of the fluid, a pointer magnet coupled to a pointer and in communication with the sensor magnet for moving the pointer in correspondence with a movement of the sensor magnet, and wherein the pointer traverses across both the first and second pluralities of graduation marks for indicating the pressure of the fluid in either an ascending direction or descending direction.

In some embodiments, the first plurality of graduation marks are placed in a first arc. In further embodiments, the second plurality of graduation marks are placed in a second arc concentric with the first arc.

In another embodiment, the sensor magnet is in communication with a first inlet for permitting a pressurized first fluid to enter the gauge and a second inlet for permitting a pressurized second fluid to enter the gauge.

In yet another embodiment, the gauge is connected to a hose and a valve, thereby defining a kit.

In further embodiments, the first and second pluralities of graduation marks are generally perpendicular to an axis of the pointer.

In another embodiment, the gauge for indicating a pressure of a fluid includes a gauge having a face, where the face has a first plurality of graduation marks, each for indicating a pressure in an ascending direction. The face also has a second plurality of graduation marks, each for indicating a pressure in a descending direction. The gauge also includes first and second inlets for permitting first and second fluids to enter the gauge, the difference of which is measured by the gauge. The gauge has a sensor magnet for detecting a difference in pressure between the first and second fluids, where the sensor magnet is movable between the first and second inlets depending upon the pressure of the first and second fluids. A pointer magnet is in communication with the sensor magnet for rotating as the sensor magnet moves between the first and second inlets, and where the pointer magnet is coupled to a pointer. Wherein rotation of the pointer magnet causes the pointer to rotate and wherein the pointer traverses across both the first and second pluralities of graduation marks for indicating the pressure of the fluid in either an ascending direction or descending direction.

In some of these embodiments, the pointer magnet rotates about an axis generally perpendicular to a direction of movement of the sensor magnet. In further embodiments, the first and second pluralities of graduation marks are shaped as arcs having a common center.

In another aspect of the invention, a method for providing a gauge for indicating a pressure of a fluid includes the steps of providing a gauge with a face and placing a first plurality of graduation marks on the face, each mark for indicating a pressure in an ascending direction. The method also includes placing a second plurality of graduation marks on the face, each mark for indicating a pressure in a descending direction. The method also has the steps of detecting the pressure of the fluid with a sensor magnet, responding to pressure in the ascending or descending direction by correspondingly moving the sensor magnet as the pressure ascends or descends, and coupling a pointer to the sensor magnet such that movement of the sensor magnet in the ascending or descending direction corresponds with a movement of the pointer in the ascending or descending direction, respectively.

In some embodiments, the method includes the step of communicating movement of the sensor magnet to the pointer with a pointer magnet.

In further embodiments, the method has the step of placing the first plurality of graduation marks in a first arc. In some of these embodiments, the method places the second plurality of graduation marks in a second arc concentric with the first arc.

In yet another embodiment, the method includes placing a sensor magnet in communication with a first inlet for permitting a pressurized first fluid to enter the gauge and a second inlet for permitting a pressurized second fluid to enter the gauge.

In some of these embodiments, the method includes the step of connecting a hose and a valve to the gauge, thereby defining a kit.

In further embodiments, the method has the step of placing the first and second pluralities of graduation marks generally perpendicular to an axis of the pointer.

BRIEF DESCRIPTION OF THE DRAWINGS

FIG. 4 more particularly depicts a sensor magnet, spring, pointer magnet, and other internal parts of the gauge shown in FIG. 1.

DETAILED DESCRIPTION

Figure 1:
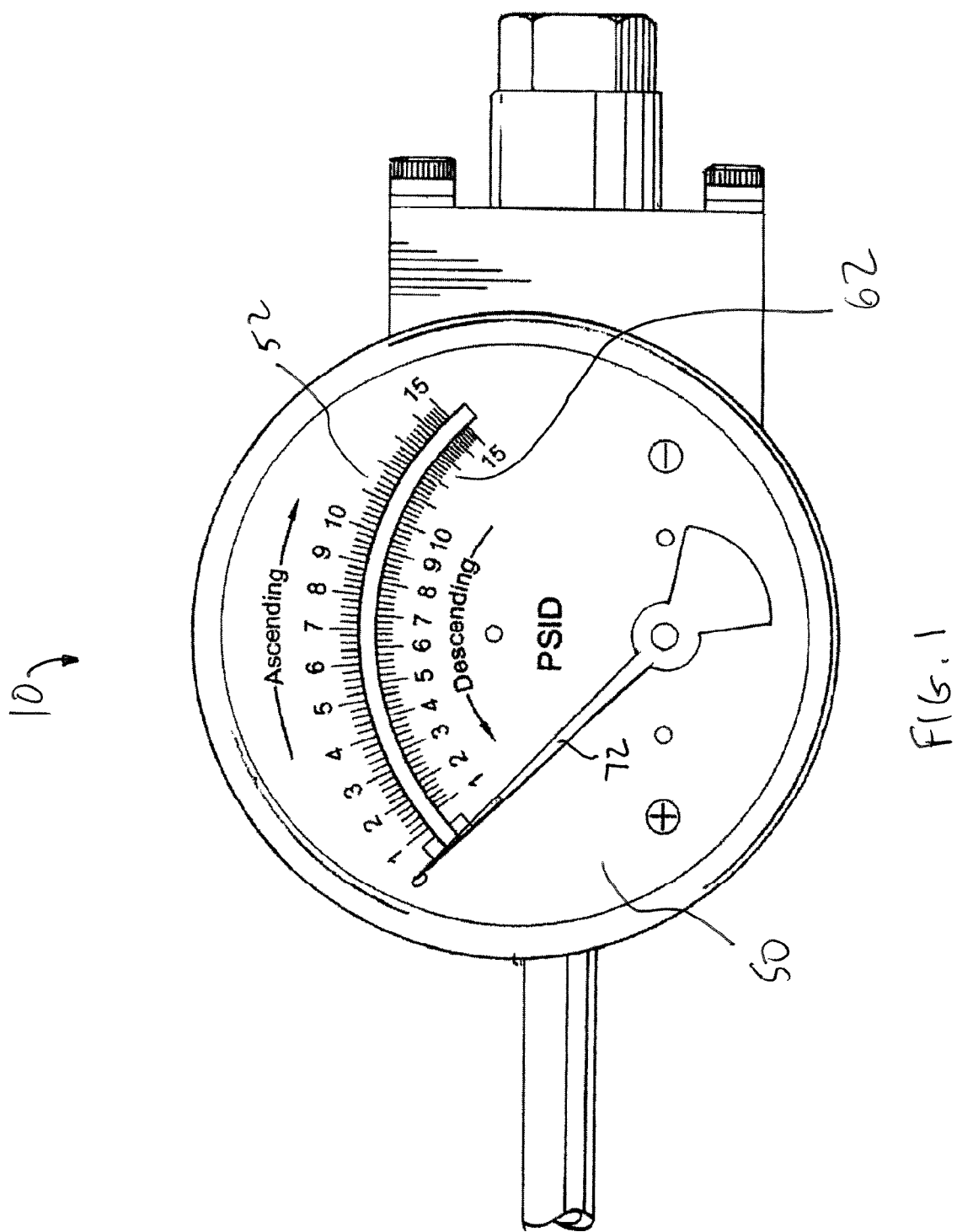
FIG. 1 depicts the gauge in accordance with the invention.

FIGS. 1 and 3a-3d depict gauge 10 in accordance with the invention. As shown, gauge 10 includes face 50, first inlet 20, and second inlet 30. Face 50 indicates a pressure difference between first inlet 20 and second inlet 30 and for calibration purposes, includes first 52 plurality of graduation marks and second 62 plurality of graduation marks for calibrating gauge 10 as the pressure is ascending or descending, respectively.

As shown, each 54 mark of first 52 plurality of graduation marks indicates a pressure in an ascending direction. Each 64 mark of second 62 plurality of graduation marks indicates a pressure in a descending direction. Referring to FIG. 2, to determine a pressure differential across an article, such as a filter, first hose 36 (which is usually attached to one side of the article) is attached to first inlet 20 and second hose 37 (which is usually attached to the opposite side of the article) is attached to second inlet 30. A pressure differential, or loss of pressure across the article, will be ascertained simply by reading face 50 and, more particularly, the pressure differential will be indicated by the graduation mark to which pointer 72 is pointing.

Gauge 10 includes sensor magnet 44, which moves axially in response to pressure of fluids entering first and second inlets 20, 30. Sensor magnet 44 moves axially in response to the pressure entering through first inlet 20. Spacer 38 is attached to sensor magnet 44 and spring is placed between spacer 38 and far wall 42. Spacer 38 is for providing a fixed distance between sensor magnet 44, where the distance is indicative of the radial travel of pointer 72 (FIGS. 3a and 3c), wherein full compression of spring 46 (FIG. 3d) is approximately one end of first or second plurality of graduation marks 52, 62 and wherein removal of compressive forces upon spring 46 (FIG. 3b) is approximately the opposite end of first or second plurality of graduation marks 52, 62. Pointer magnet 74 is in communication with sensor magnet 44 where an axial movement of sensor magnet 44 causes pointer magnet 74 to rotate. This is accomplished by, for example, polarizing one end of sensor magnet 44 as positive and an opposite end of sensor magnet 44 as negative. Pointer magnet 74 would likewise have a positive and negative. Because opposite polarities attract, the axial movement of the positive end of sensor magnet 44 will attract the negative side of pointer magnet 74, and if the negative side of pointer magnet 74 follows sensor magnet's positive side, pointer magnet 74 will rotate. It is understood that positive and negative is replaced with north/south polarities in other embodiments.

As shown, as sensor magnet 44 moves axially toward spring 46 due to pressure from fluid entering first inlet 20, pointer magnet 74 rotates due to the magnetic attraction toward sensor magnet 44. Diaphragm 48 inhibits fluid from passing, or fluid transfer, from first inlet 20 to second inlet 30 and from second inlet 30 to first inlet 20, resulting in an increase in accuracy of gauge 10 because fluid that passes or leaks is not accounted for in the reading. Therefore, readings would be lower than in actuality. Rotation of pointer magnet 74 corresponds to rotation of pointer 72. Pointer 72 is also magnetically coupled to pointer magnet 74. In other embodiments, pointer 72 is physically attracted to pointer magnet 74. In this effort, rotational movement of pointer 72 corresponds to axially movement of sensor magnet 44, wherein pointer 72 traverses across both first and second pluralities 52, 62 of graduation marks for indicating the pressure of the fluid in either an ascending direction or descending direction. For pointer 72 to measure a pressure differential in a reverse direction from that shown, first and second hoses 36, 37 are simply reversed.

As shown, first 52 plurality of graduation marks are placed in a first arc and second 62 plurality of graduation marks are placed in a second arc concentric with the first arc. Also as shown, first and second pluralities 52, 62 of graduation marks are generally perpendicular to an axis of pointer 72.

When in use, a traditional gauge often entailed measuring the pressure as the pressure is increasing or decreasing, depending upon the type of fluid or instrument being used. Moreover, the traditional gauge often included a single plurality of graduation marks for measuring pressure in one direction, but not the other. The result was that a user would typically carry two gauges, one for measuring pressure in an ascending direction and one for measuring pressure in a descending direction.

Gauge 10 eliminates the need for multiple gauges because first 52 and second 62 pluralities of graduation marks enable the user to measure pressure in either the ascending or descending direction.

For example, liquid level in a pressurized tank is usually calibrated as pressure is decreasing or descending. In another example, a filter application usually is calibrated as pressure increases.

Typical codes and/or regulations require measurement in either the ascending or descending direction to be within approximately 2% accuracy. Therefore, gauge 10 is calibrated in both directions to reduce hysteresis in both directions.

Figure 2A:
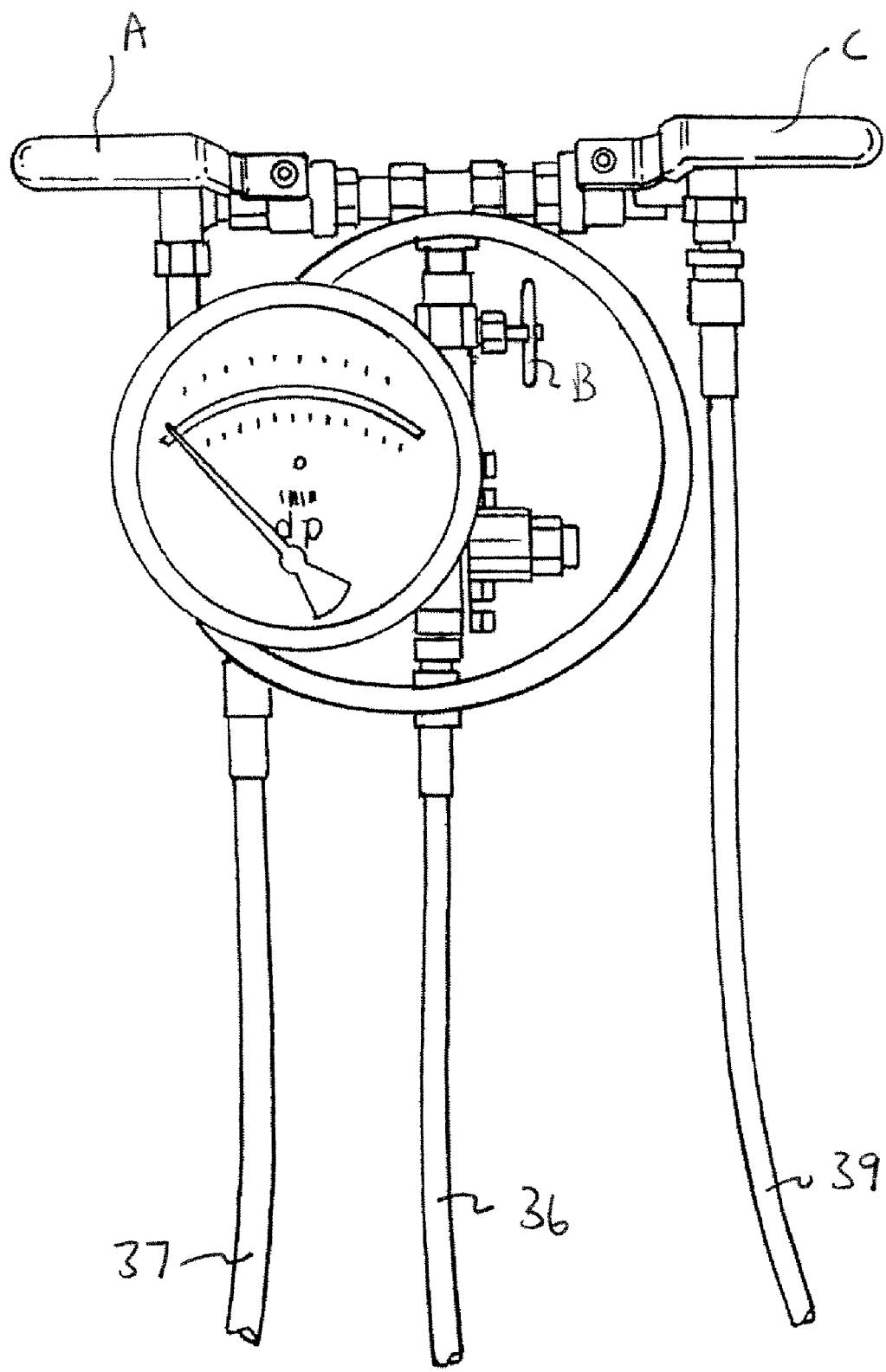
FIGS. 2a-2b depict the gauge shown in FIG. 1 along with other components for defining a kit.
Figure 2B:
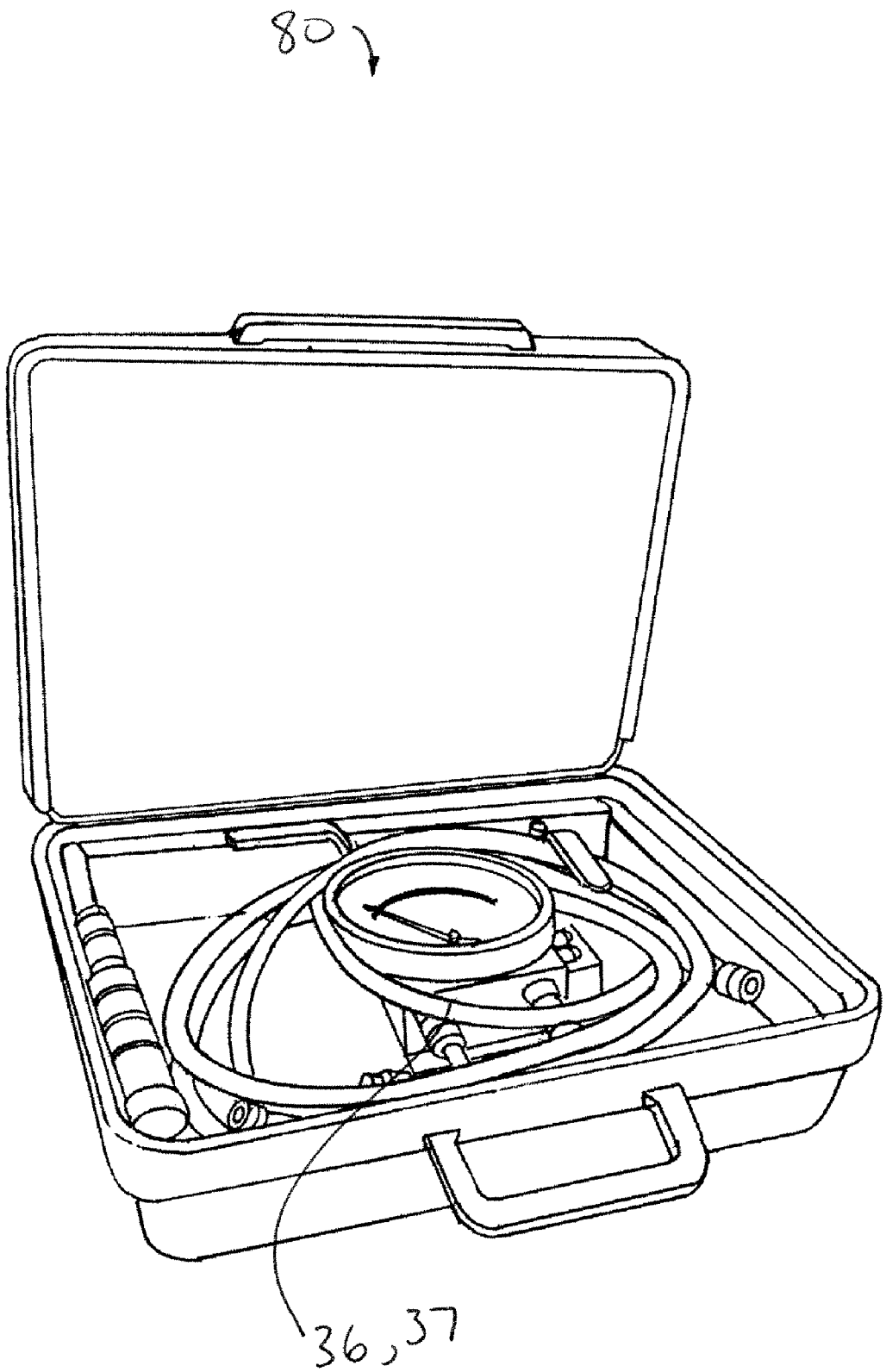
Figure 3A:
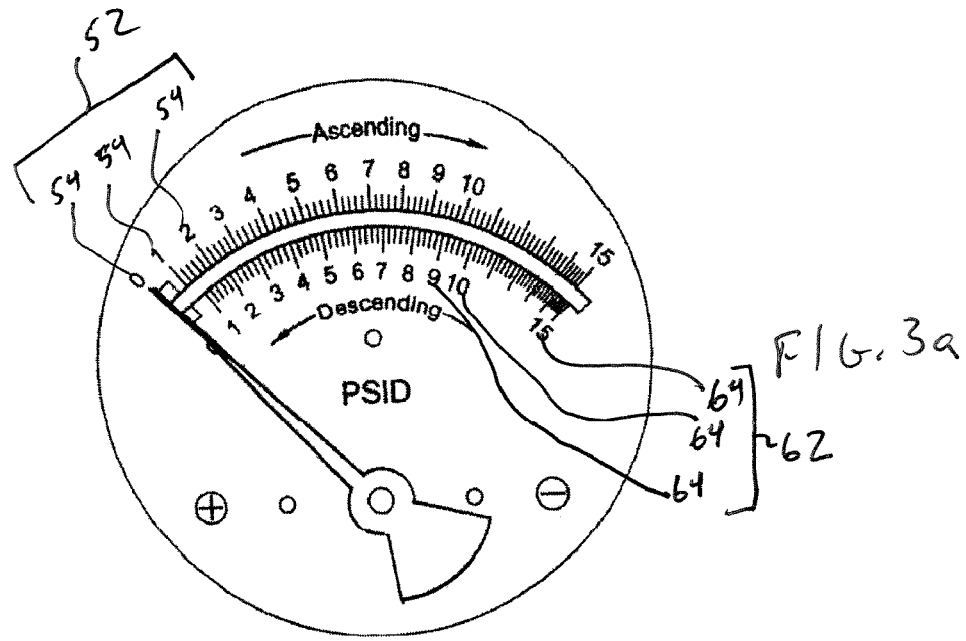
FIGS. 3a-3d more particularly depict a face and a transition of internal components of the gauge shown in FIG. 1.
Figure 3B:
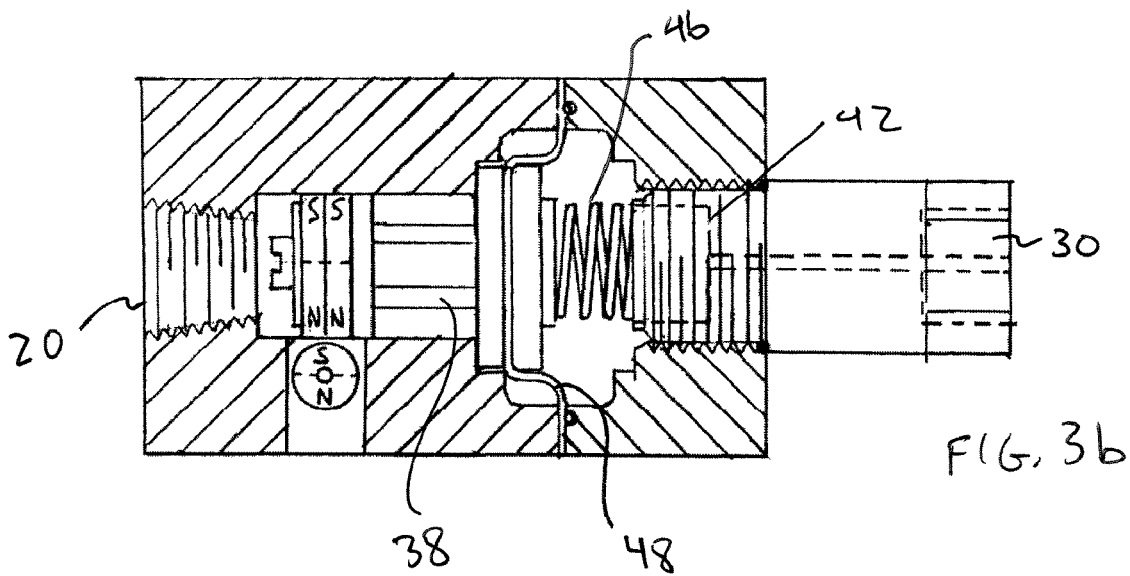
Figure 3C:
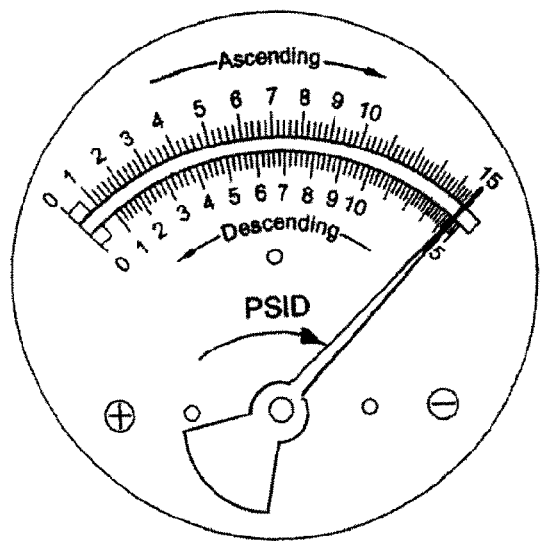
Figure 3D:
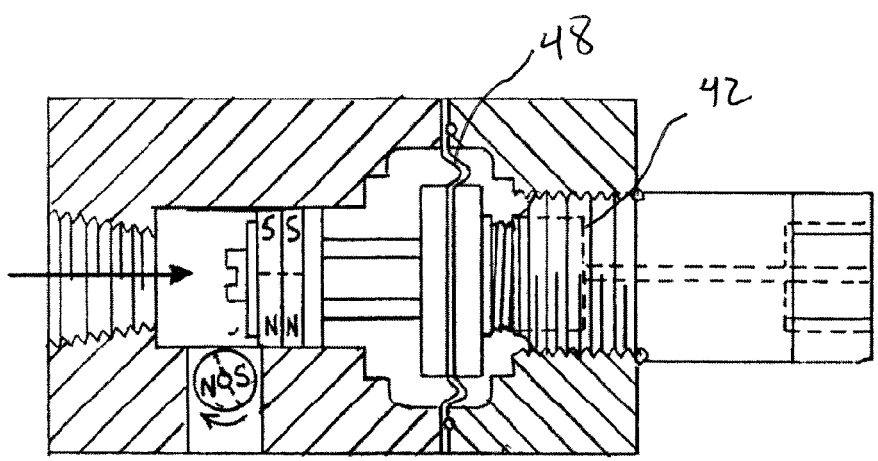
Figure 5:
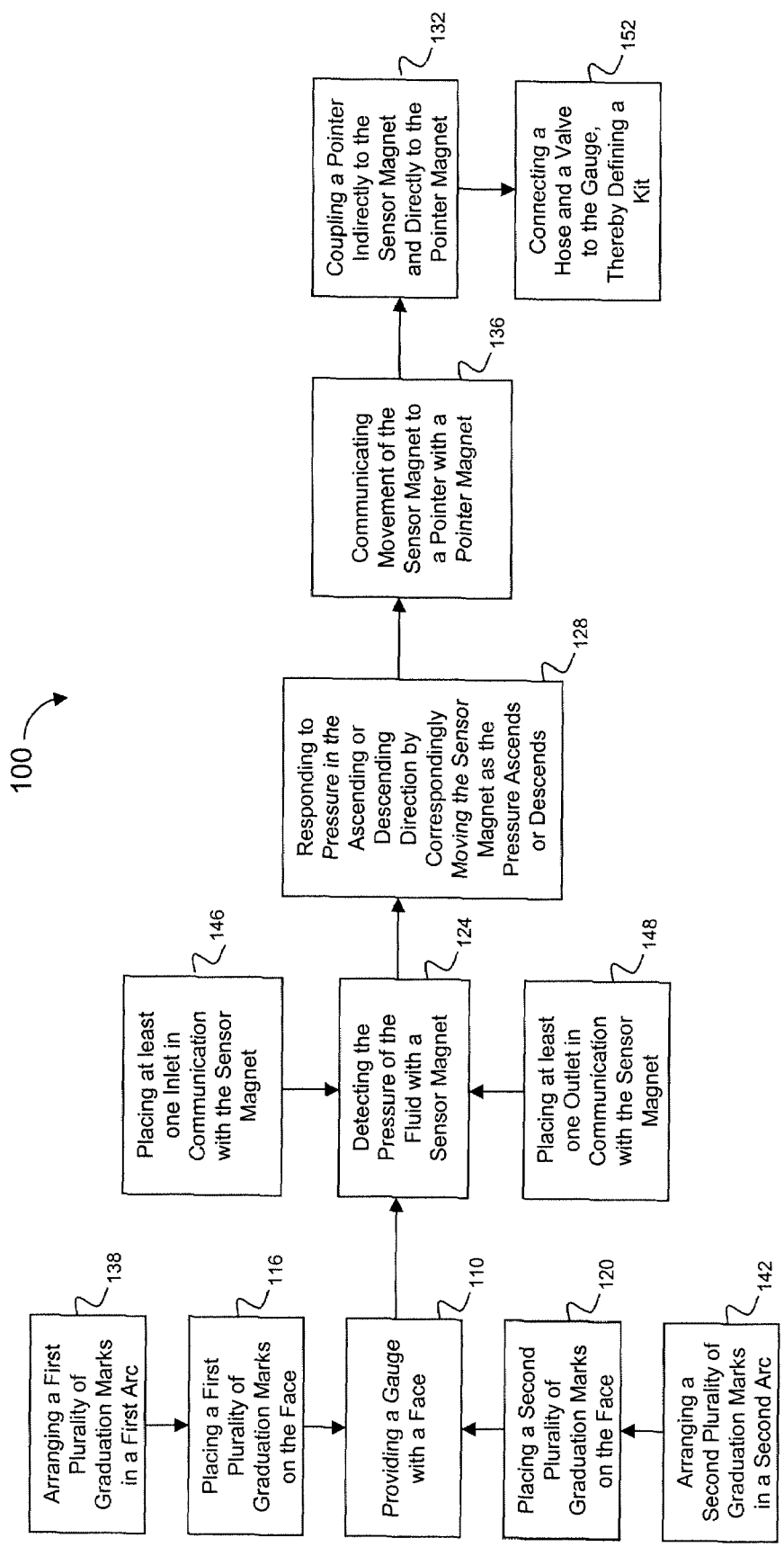
FIG. 5 depicts a method of providing the gauge shown in FIG. 1.

In addition to gauge 10, hoses and valves are attached to and used with gauge 10. FIGS. 2a-2b depicts some embodiments where kit 80 includes high hose 36, low hose 37, vent hose 39, and ball valves A, B, and C.

In another aspect of the invention, and as shown in FIG. 6, method 100 for providing the gauge shown in FIG. 1 is shown, the method including the steps of providing 110 a gauge with a face and placing 116 a first plurality of graduation marks on the face, each mark for indicating a pressure in an ascending direction. Method 100 also includes placing 120 a second plurality of graduation marks on the face, each mark for indicating a pressure in a descending direction. Method 100 also has the steps of detecting 124 the pressure of the fluid with a sensor magnet, responding 128 to pressure in the ascending or descending direction by correspondingly moving the sensor magnet as the pressure ascends or descends, and coupling 132 a pointer to the sensor magnet such that movement of the sensor magnet in the ascending or descending direction corresponds with a movement of the pointer in the ascending or descending direction, respectively.

In some embodiments, method 100 includes the step of communicating 136 movement of the sensor magnet to the pointer with a pointer magnet.

In further embodiments, method 100 places 138 the first plurality of graduation marks in a first arc and places 142 the second plurality of graduation marks in a second arc concentric with the first arc. In some of these embodiments, the first and second pluralities of graduation marks are generally perpendicular to an axis of the pointer.

In yet another embodiment, method 100 places 146 a sensor magnet in communication with a first inlet for permitting a pressurized first fluid to enter the gauge and places 148 the sensor magnet in communication with a second inlet for permitting a pressurized second fluid to enter the gauge, the difference of which will be measured by the gauge and indicated by the pointer.

In some of these embodiments, method 100 includes the step of connecting 152 a hose and connecting a valve to the gauge, thereby defining the step of providing a kit.

What is claimed is:

1. A gauge for indicating a pressure of a fluid, comprising:
   a face having a first plurality of graduation marks for indicating a pressure, where said first plurality is calibrated to measure pressure that is ascending;
   said face having a second plurality of graduation marks for indicating a pressure, where said second plurality is calibrated to measure pressure that is descending;
   said gauge including a sensor magnet for detecting the pressure of the fluid;
   a pointer magnet coupled to a pointer and in communication with said sensor magnet for moving said pointer in correspondence with a movement of said sensor magnet; and
   wherein said pointer traverses across both said first and second pluralities of graduation marks for indicating the pressure of the fluid in either an ascending direction or descending direction; and
   wherein said first plurality of graduation marks represent a first scale and said second plurality of graduation marks represent a second scale that is different from said first scale.

2. The gauge according to claim 1, wherein said first plurality of graduation marks are placed in a first arc.

3. The gauge according to claim 2, wherein said second plurality of graduation marks are placed in a second arc concentric with said first arc.

4. The gauge according to claim 1, wherein said sensor magnet is in communication with at least one inlet for permitting pressurized fluid to enter said gauge.

5. The gauge according to claim 1, further comprising a hose and a valve connected to said gauge, thereby defining a kit.

6. The gauge according to claim 1, wherein said first and second pluralities of graduation marks are generally perpendicular to an axis of said pointer.

7. A gauge for indicating a pressure of a fluid, comprising:
   a face having a first plurality of graduation marks for indicating a pressure, where said first plurality is calibrated to measure pressure that is ascending;
   said face having a second plurality of graduation marks for indicating a pressure, where said second plurality is calibrated to measure pressure that is descending;
   a first inlet for permitting a first fluid to enter said gauge;
   a second inlet for permitting a second fluid to enter said gauge;
   said gauge including a sensor magnet for detecting a difference in pressure between said first and second fluids;
   said sensor magnet is movable between said first and second inlets depending upon the pressure of said first and second fluids;
   a diaphragm between said first and second inlets for reducing fluid transfer between said first and second inlets;
   a pointer magnet in communication with said sensor magnet for rotating as said sensor magnet moves between said first and second inlets;
   said pointer magnet is coupled to a pointer;
   wherein rotation of said pointer magnet causes said pointer to rotate;
   wherein said pointer traverses across both said first and second pluralities of graduation marks for indicating the pressure of the fluid in either an ascending direction or descending direction; and
   wherein said first plurality of graduation marks represent a first scale and said second plurality of graduation marks represent a second scale that is different from said first scale.

8. The gauge according to claim 7, wherein said pointer magnet rotates about an axis generally perpendicular to a direction of movement of said sensor magnet.

9. The gauge according to claim 7, wherein said first and second pluralities of graduation marks are shaped as arcs having a common center.

10. A method for providing a gauge for indicating a pressure of a fluid, comprising the steps of:
    providing a face;
    placing a first plurality of graduation marks that represent a first scale on the face for indicating a pressure, said first plurality is calibrated to measure pressure that is ascending;
    placing a second plurality of graduation marks that represent a second scale different from said first scale on the face for indicating a pressure, said second plurality is calibrated to measure pressure that is descending;
    detecting the pressure of the fluid with a sensor magnet;
    responding to pressure that is ascending or descending by correspondingly moving the sensor magnet as the pressure ascends or descends; and
    coupling a pointer to the sensor magnet such that movement of the sensor magnet in an ascending or descending direction corresponds with a movement of the pointer in an ascending or descending direction, respectively.

11. The method according to claim 10, further comprising the step of communicating movement of the sensor magnet to the pointer with a pointer magnet.

12. The method according to claim 11, further comprising the step of placing the second plurality of graduation marks in a second arc concentric with the first arc.

13. The method according to claim 10, further comprising the step of placing the first plurality of graduation marks in a first arc.

14. The method according to claim 10, further comprising the step of placing the sensor magnet in communication with a first inlet and a second inlet for permitting first and second pressurized fluids to enter the gauge.

15. The method according to claim 10, further comprising the step of connecting a hose and a valve to the gauge, thereby defining a kit.

16. The method according to claim 10, further comprising the step of placing the first and second pluralities of graduation marks generally perpendicular to an axis of the pointer.

* * * * *